Figure 1:
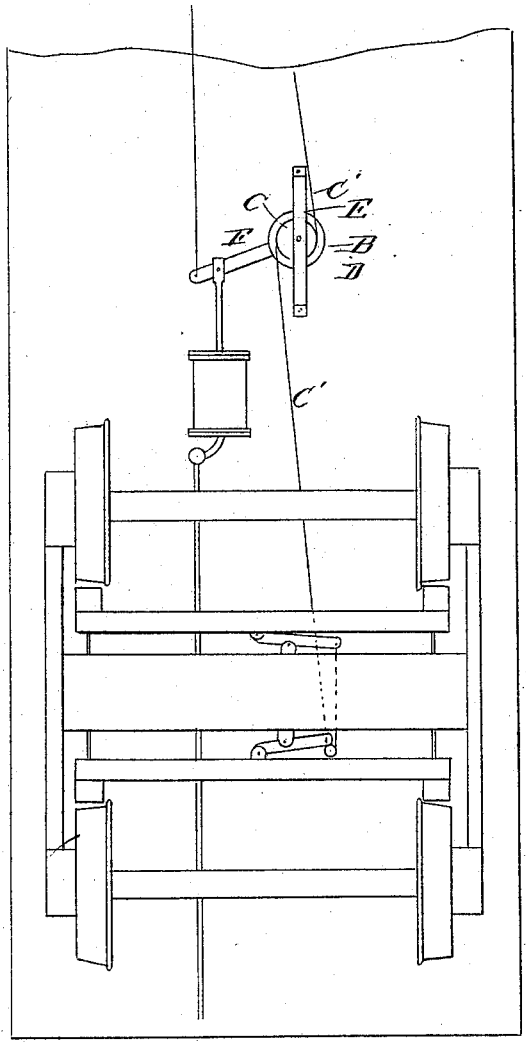

(No Model.) 3 Sheets—Sheet 1.

R. J. WILSON.
AUTOMATIC CAR BRAKE.

No. 363,310. Patented May 17, 1887.

WITNESSES: INVENTOR

BY

ATTORNEYS (No Model.)  R. J. WILSON.  3 Sheets—Sheet 2.
AUTOMATIC CAR BRAKE.
No. 363,310.  Patented May 17, 1887.
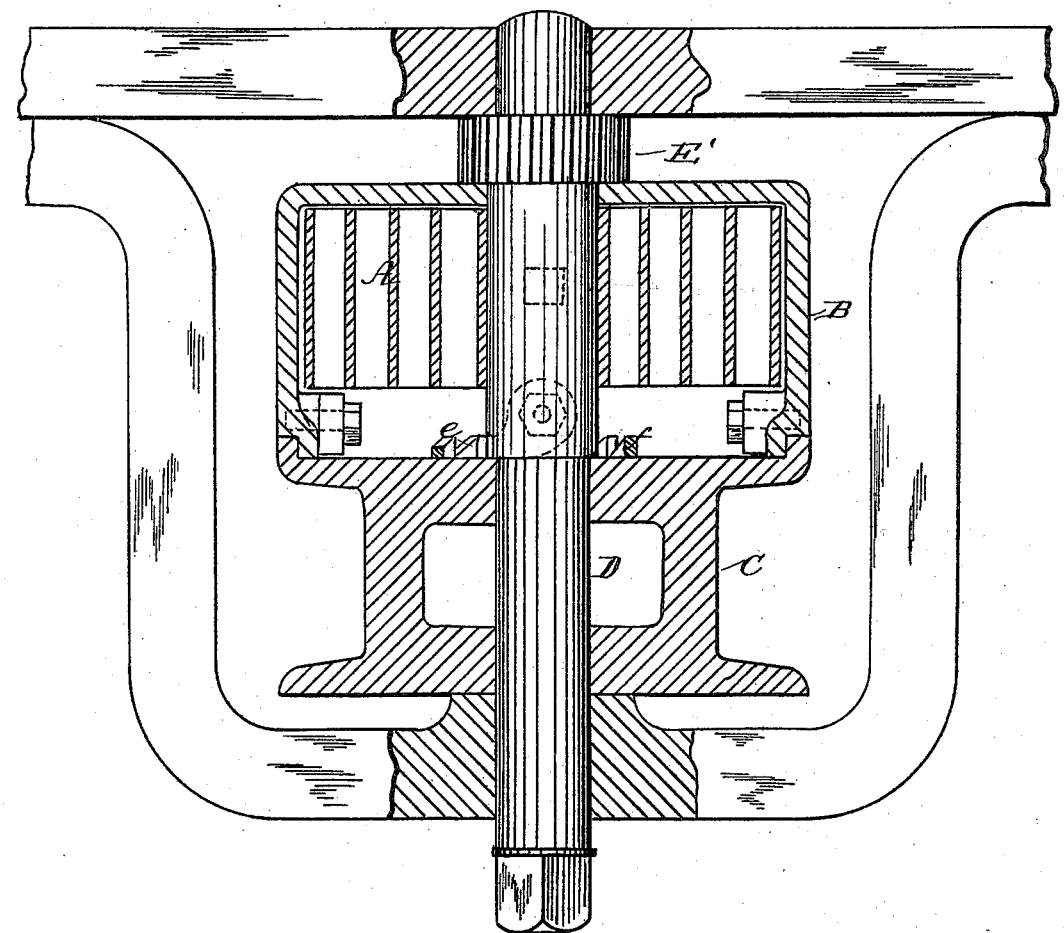

(No Model.)
R. J. WILSON.
AUTOMATIC CAR BRAKE.
No. 363,310. Patented May 17, 1887.
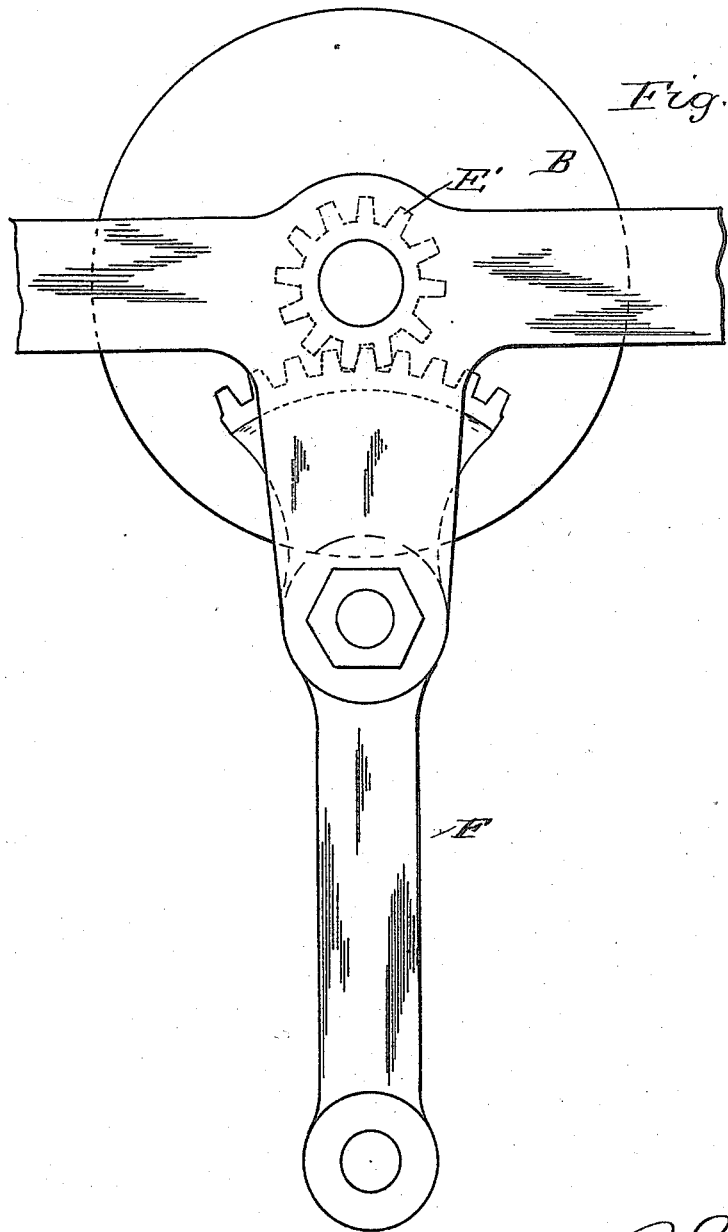

UNITED STATES PATENT OFFICE.

ROBERT J. WILSON, OF PITTSBURG, PENNSYLVANIA.

AUTOMATIC CAR-BRAKE.

SPECIFICATION forming part of Letters Patent No. 363,310, dated May 17, 1887.

Application filed October 13, 1886. Serial No. 216,087. (No model.)

*To all whom it may concern:*

Be it known that I, ROBERT J. WILSON, a citizen of the United States, residing at Pittsburg, in the county of Allegheny and State of Pennsylvania, have invented certain new and useful Improvements in Automatic Car-Brakes; and I do hereby declare the following to be a full, clear, and exact description of the invention, reference being had to the accompanying drawings, which form part of this specification.

This invention has relation to automatic brakes for railroad-cars, and has for its object the provision of a novel construction of brake wherein the tension of a coiled spring is utilized to close or lock and keep closed or locked the brake, while air, steam, or other fluid pressure under the control of the engineer is employed to open or release the brake and keep the same open or released while the train is running.

In automatic brakes it has heretofore been the practice to employ air or other fluid pressure as the power for actually closing or locking the brakes. For this purpose it has been and is necessary to maintain the fluid normally under very high pressure in order to overcome the resistance of the brake and connections when subject to the strain of a running train in order to render the apparatus effective. It has also been necessary to employ complex, delicate, and expensive apparatus, rendering the brakes uncertain and unreliable.

My invention contemplates the provision of apparatus of comparatively simple construction which shall be fully as effective as, if not superior in operativeness to, the brake apparatus in use, and which shall, moreover, be absolutely certain and reliable, so as to be incapable of failure in cases of emergency. Where air or other fluid pressure is depended upon for actually closing or putting down the brakes, there is always the danger to be apprehended of leakage reducing the pressure, so as to render the brake inoperative. It is therefore of the greatest importance that the braking appliances should be independent of any force subject to fluctuation or decrease, and that they be controlled and operated by positively-acting mechanical appliances. With this end and object in view I have contrived, and shall describe, a brake apparatus wherein the brake-closing or locking power is derived from a coiled spring, which may be partially unwound through the agency of air or fluid pressure devices under the control of the engineer, so as to release and keep open the brakes until it becomes necessary to close or lock them. The closing or locking of the brakes is entirely automatic, and is accomplished solely by the action of the spring when the same is released; hence when the fluid pressure is removed, either intentionally or through failure in the air-pressure devices or the severance of connections, the brakes are instantly closed and safety insured.

I am aware that the ordinary air-brakes are intended to operate automatically in case of accident, as the dividing of a train; but as this automatic operation is dependent on the pressure of the air in the cylinder, any failure of the latter, as from leakage or impairment of the valves and connections, will render the brakes inoperative.

My invention consists in the novel construction and combination of devices hereinafter described and claimed, and particularly to the combination of a coiled spring and its appurtenances with fluid-pressure devices, whereby the brakes are opened or released through the partial uncoiling of the spring.

In the accompanying drawings, Figure 1 is an under side plan view of a railroad-car to which my invention is applied. Fig. 2 is a vertical central section of the coiled spring and connections. Fig. 3 is a detail view.

In practice each car is provided with a separate horizontally-coiled spring, A—that is, a plate-spring coiled so as to form a helix of sufficient tensile strength, capacity, and dimension—which is inclosed in a cylindrical barrel, B, having attached thereto a chain-drum, C. A vertical winding shaft or arbor, D, passes through the drum and barrel, and has its bearings in a yoke or frame, E, fastened to the bottom of the car in a central position, or midway between the ends of the car. The inner end of the spring is fastened to the shaft D and the outer end fastened to the barrel B. The lower end of the shaft is squared for the application of a winding lever or key, by which the spring is wound to any desired working tension. A pawl, $e$, engaging with a ratchet, $f$, in the usual way, prevents the spring from recoiling. Upon the upper end of the shaft is fitted a pinion, E', engaging with the segmental toothed end of a lever, F, which is pivoted under and to the frame of the car and coupled at its outer end or by its long arm to the piston G of the air or other fluid pressure cylinder, H. The latter has the usual connections by tubes $g$ with the pressure-reservoir on the engine. The drum C is connected by chains C' to the brake-levers.

Normally, the spring is wound to such a tension as will tend to keep the brakes closed under adequate pressure or strain. When the train is coupled up, the fluid-pressure is applied and releases the brakes, maintaining them open, the spring and fluid pressure being nearly at equilibrium. Now, in order to close the brakes, it is only necessary to reduce or cut off the fluid-pressure, whereupon the spring will expand, and in so doing turn the drum so as to wind up the chains and pull the brakes into contact with the wheels of the car. The brakes can then be released from the engine only by renewing the pressure or upon each car by hand, the levers F being connected to the usual hand-brake appliances.

As the spring, except when controlled by the air or fluid pressure, is constantly tending to close the brakes, the latter will be operated in any emergency, either upon failure of the pressure at its point of control or by the dividing of the train.

The safety of the train is in no wise endangered by the decrease of pressure from leakage or other causes, as where air-pressure is used to close the brakes, because the brakes will be automatically closed by the spring the instant full control of them is lost.

My improved brake is particularly applicable to freight-cars, being simpler and less expensive, as well as more effective and certain, than the ordinary air-brake.

Having fully described my invention, what I claim as new, and desire to secure by Letters Patent, is—

1. In automatic railway-car brakes, the combination, with fluid-pressure devices, substantially as described, of a coiled plate-spring, its barrel, a winding-shaft, and a chain-drum, as set forth.

2. In automatic car-brake appliances, the combination, with the brakes and with the air or fluid pressure devices, of automatic spring brake mechanism consisting of a coiled plate-spring, an inclosing-barrel, a winding-shaft having a toothed pinion, a toothed lever engaging with said pinion, and a chain-drum, substantially as described.

In testimony that I claim the foregoing I have hereunto set my hand this 11th day of October, 1886.

ROBERT J. WILSON.

Witnesses:
 THOS. A. CONNOLLY,
 JOHN F. ATCHESON.